Sept. 24, 1935.     O. W. GREENE     2,015,107
POWER TRANSMISSION
Filed March 7, 1931     2 Sheets-Sheet 1
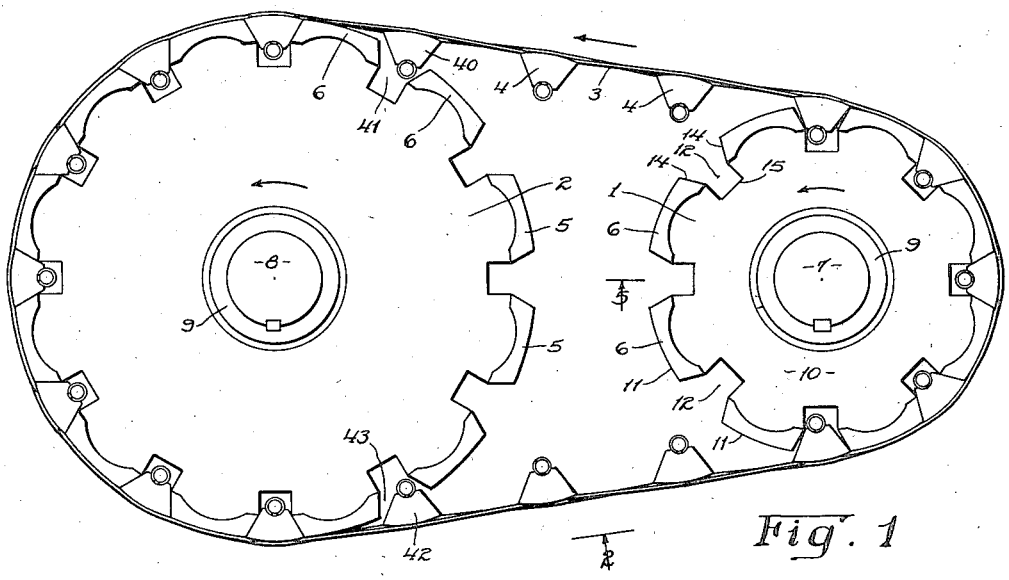
Fig. 1
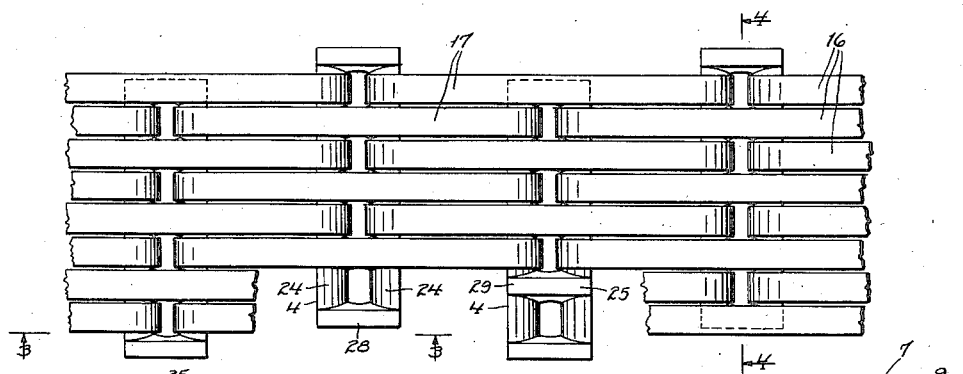
Fig. 2
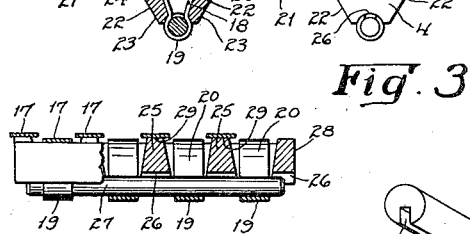
Fig. 3
Fig. 4
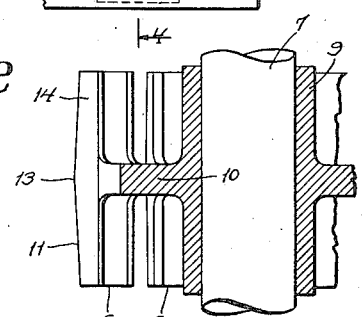
Fig. 5
Fig. 6
Fig. 7
INVENTOR.
Otto W. Greene
BY Slough and Canfield
ATTORNEYS Sept. 24, 1935.    O. W. GREENE    2,015,107
POWER TRANSMISSION
Filed March 7, 1931    2 Sheets-Sheet 2

INVENTOR.
Otto W. Greene
BY
Clough and Canfield
ATTORNEYS

Patented Sept. 24, 1935

2,015,107

UNITED STATES PATENT OFFICE 2,015,107

POWER TRANSMISSION

Otto W. Greene, Elyria, Ohio, assignor to The Guardianair Corporation, Elyria, Ohio, a corporation of Ohio Application March 7, 1931, Serial No. 520,872

32 Claims. (Cl. 74—245)

This invention relates to power transmission devices and particularly to power transmissions of the endless belt or sprocket type.

Heretofore, various endless belt or chain transmissions have been devised providing positive or intermeshed engagement between the belt or chain and the wheels or pulleys between which power is transmitted. Such prior devices as is well known comprehend various types of chains and corresponding toothed wheels or sprockets; belts composed of toothed links, the teeth engaging corresponding meshing teeth on the wheel or sprocket; belts provided with teeth or projections adapted to mesh with and engage corresponding teeth or tooth spaces in the wheel or pulley; etc. etc.

All such prior transmission devices however have objectionable features of construction and of operation, such as, for example, the friction and wear developed in the hinging links of the chain and the friction and wear developed between the chain and the wheel as it approaches and leaves the wheel; the great cost when the parts are accurately made so as to function properly and the relatively great weight thereof; noise of impact between the teeth of the chain or belt and the teeth of the cooperating wheels; the necessity of slack in the chain or belt to reduce wear and the resulting unsuitability for transmitting uneven torque or vibratory loads.

It is therefore one of the objects of this invention to provide an improved transmission of the endless belt type.

It is another object to provide a transmission of the endless belt type having an improved mode of operation.

It is another object to provide an improved transmission of the endless belt type which will be cheap to manufacture and which will be efficient in operation.

Another object is to provide in an endless belt transmission a toothed belt of improved construction rendering it elastic whereby all slackness may be eliminated and whereby vibratory load may be transmitted in an improved manner.

Another object is to provide a transmission of the endless belt type which may have positive intermeshing engagement with its mating pulleys and/or sprockets and in which all pivoting or hinging movements, of one part relative to another, in the belt, are eliminated.

It is another object of my invention to provide a transmission of the class referred to in which substantially all friction of the kind effected by the relative movement of two elements in contact engagement with each other is eliminated.

Another object is to provide a transmission of the class referred to in which substantially the only friction developed is of the kind known as internal molecular friction of material.

Another object is to provide an improved transmission of the endless belt type in which the belt proper of the transmission may be formed from resilient band-like material.

Another object is to provide an endless belt transmission of the type comprising an endless belt and a plurality of longitudinally spaced teeth thereon and in which the teeth are secured to the belt in an improved manner.

Another object is to provide, for transmissions of the endless belt type, an improved construction of tooth for the belt.

Another object is to provide, for use with transmissions of the endless belt type, an improved construction of wheel or pulley adapted to mate with teeth on the belt.

Another object is to provide, in transmissions of the endless belt type having a belt proper with longitudinally spaced teeth thereon intermeshing with corresponding teeth on a mating pulley or wheel, an improved construction of wheel tooth and belt tooth whereby they may move into mesh and out of mesh subsantially without sliding friction therebetween.

Other objects will be apparent to those skilled in the art to which my invention appertains.

My invention is fully disclosed in the following description taken in connection with the accompanying drawings in which:—

Fig. 1 is a side elevational view of a transmission embodying my invention;

Fig. 2 is a view on an enlarged scale of one of the flights of the transmission of my invention and taken approximately from the plane 2 of Fig. 1;

Fig. 3 is a view taken approximately from the plane 3—3 of Fig. 2;

Fig. 4 is a view taken from the plane 4 of Fig. 2;

Fig. 5 is a fragmentary view taken from the plane 5 of Fig. 1 and illustrating in cross section one of a pair of wheels or pulleys which I may employ and which wheel or pulley is shown in Fig. 1;

Fig. 6 is a view similar to a part of Fig. 3 but drawn to a larger scale and showing one manner of connecting the ends of a belt element which I may employ;

Fig. 7 is a perspective view of a pin element which I may employ and which is shown in cross section in Fig. 6;

Figure 9:
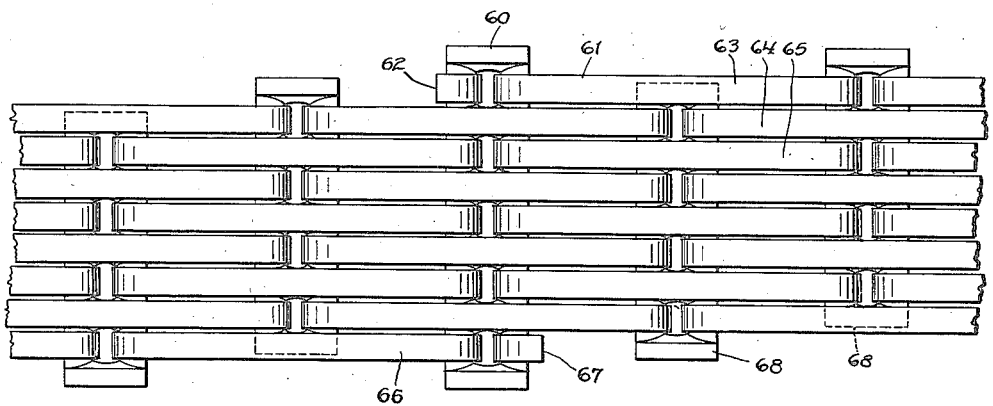
Fig. 9 is a view similar to Fig. 2 showing a modification.

Referring to the drawings, in Fig. 1 I have shown at 1 and 2, respectively, a driving and a driven wheel and at 3 generally a belt provided with a plurality of teeth 4—4 adapted to intermesh with corresponding teeth 5—5 on the wheel 2, and with teeth 6—6 on the wheel 1.

The wheels 1 and 2 may be supported in any suitable manner as for example upon shafts 7 and 8 respectively to which suitable hubs 9 and 10 respectively on the wheels may be keyed.

The wheels 1 and 2 as shown in Fig. 5 for the wheel 1 besides the hub 9 may have a web-like body portion 10 in a plane transversely of the rotational axis on the outer periphery of which the teeth 6—6 are disposed. The teeth, in planes coincident with the wheel axis are of T-shape in cross section. Thus the web 10 supports a circular belt engaging surface 11 such as that of an ordinary belt pulley, but in this case interrupted by peripherally spaced so-called tooth spaces 12—12 to be more fully described. The belt surface 11, similarly to that of ordinary belt-driven pulleys is "crowned", that is the surface 11 is slightly conical on each side of the center ridge 13.

The tooth spaces 12 are so formed as to provide each a pair of circumferentially spaced confronting faces 14—14, planular and disposed so that if the planes thereof were extended inwardly toward the axis of the wheel, they would intersect in a line parallel to the axis, that is to say the space included between the faces 14—14 is wedge-shaped. The angle between the faces 14—14 is preferably 60°.

The circumferential width of the tooth space 12 and the generally radial depth of the faces 14 is proportioned to the size of the teeth 4, to be more fully described. For the sake of light weight and economy of material, the radial extent of the faces 14 is limited to the extent of engagement therewith by the teeth 4, and the axial extent of the faces 14 is determined by the desired axial width of the belt, which will be more clearly understood later. The teeth proper, 6—6, therefore comprise the faces 14 and the surface 11 on the cross portion of the T-section referred to and the web 10 connecting this cross portion with the hub 9 constitutes the stem of the T-section.

For purpose of clearance, to clear the inner ends of the teeth 4 to be described, the web 10 may be recessed as at 15 at the inner end or bottom of the tooth space 12.

The endless belt 3, is composed generally of a plurality of units 16—16, each one being, so to speak, a complete belt in itself. The units 16 are disposed parallel to each other and lie side by side and may be of any desired number disposed axially of the wheels 1 and 2. In the drawings, I have shown eight such units. For transmitting power, a number of units is selected corresponding to the amount of power to be transmitted.

Each belt unit 16 comprises a band or ribbon or belt 17 formed from resilient material such as spring steel of suitable composition. The material of the band 17 is chosen to permit permanently shaping it in portions thereof to be described without breaking or fracture and to bend resiliently in operation as will be described, well within the elastic resilient limit of material.

The bands 17 are all of the same length. Each band at spaced intervals corresponding to twice the pitch of the teeth of the wheels 1 and 2 is permanently bent to the configuration illustrated generally at 18, Fig. 3. These bent portions 18 of the band comprise an eye portion 19 of generally circular C-shape, the open ends of the C continuing in the reverse direction into curving portions 20—20 of relatively large radius which at their outer terminations continue into the straight unbent portions 21—21 of the band.

The bent portions 18 constitute means for attaching to the band 17 the teeth 4.

Each tooth 4 is formed from metal such as soft steel preferably by drop-forging or by pressing operation and preferably on the material in the cold state. And the general form of the tooth 4 is that of a trough having a plurality of transverse partitions therein. Each tooth, in this connection, has opposite side walls 22—22, generally parallel, the outer surfaces 23—23 being formed to exactly fit the faces 14—14 of the tooth spaces 12 of the wheels. Internally, the walls 22—22 converge toward the bottom of the trough form and are in cross section curved as shown at 24—24. Longitudinally of the trough it is divided up into a number of similar short trough-like recesses by spaced partitions 25—25. On the bottom of the tooth, externally thereof, is formed a longitudinal groove 26, which at points between the partitions 25 communicates with the inside of the trough.

The teeth 4 thus formed are assembled with the bands 17 by projecting the bent portions 18 of the bands downwardly into the trough-like teeth until the portion 19 projects downwardly through the bottom and then a pin 27 is threaded successively through all of the portions 19. The tooth 4 is thus secured to the bands 17, and the various interfitting parts are so dimensioned that the curving portions 20 of the band lie in close contact with the curved portions 24 of the tooth; and the straight portions 21—21 of the band between adjacent teeth join the tooth tangentially to the curved portions 24. The circular portion 19 of the band partially encircles the pin 27 and lies between the upper portions of the pin and the lower portions of the walls 22—22 of the tooth, and the pin thus interlocks the band with the tooth and prevents withdrawal of the band from the tooth.

By the construction thus described, it will be apparent that the tooth 4 is connected to the band 17 in a manner to prevent relative movement of the tooth longitudinally of the band, and that the band is not cut or weakened at any point as might be the case were rivets employed more in line with prior practice.

A staggered relation is carried out among the several bands 17 and teeth 4, as follows. A band 17 joined to one tooth 4 overlaps the next adjacent tooth without being joined thereto, and the band overlapping a tooth without being joined thereto, is disposed between adjacent bands which are attached to the tooth. This is plainly shown in Fig. 2.

The partitions 25 are shaped on their outer terminating edges to provide curved faces 28 upon which the said overlapping bands may lie, Figs. 2, 3 and 4.

It is comprehended within the scope of my invention, to provide bands 17 each of which is formed endless, but in the preferred practice of my invention the bands 17 are formed in great lengths as, for example, by an automatic machine and then are cut off in suitable lengths. To join the ends of each band 17 to form thereof an endless unit 16, the following construction is provided illustrated in Figs. 6 and 7. The two confronting ends of the band, besides having the generally circular formations at 30—30 corresponding to the portion 19 of Fig. 3, have their extreme end portions bent radially of the circular portion 30 as shown at 31—31, the two portions 31 lying in superposed relation. The pin 32, corresponding to the pin 27 of the other figures, is provided with a longitudinal groove 33, and when the pin 32 is threaded into position as above described for the pin 27, the portions 31 of the band are disposed in the groove 33 and securely held thereby in a manner that will be understood from an examination of Fig. 6 and Fig. 7.

The belt 3 thus constructed is assembled with the wheels 1 and 2 as illustrated in Fig. 1 with the teeth 4 projecting into the spaces 12 between adjacent teeth 6. The center distance between the wheels 1 and 2 is provided to stretch the belt 3 taut to a predetermined desired amount.

In operation, besides the obvious transmission of power from one wheel to the belt and thence to the other wheel, it will be observed that as a tooth 4 enters a tooth space 12, such for example as the tooth 40 entering the tooth space 41, Fig. 1, the tooth 40 does not slide on the adjacent teeth 6 or on any portion thereof, and no friction results. By choosing a suitable angle for the faces 14 of the teeth and a corresponding angle for sides of the tooth 40, such for example as 60°, the tooth 40 will not engage the teeth 6 until it has entered the tooth space sufficiently far to engage both adjacent teeth 6 simultaneously.

Similarly, when a tooth leaves the tooth space, such for example as the tooth 42 leaving the tooth space 43, the tooth leaves the space without frictional engagement with adjacent teeth.

The engagement of each tooth with the wheel is upon planular surfaces as distinguished from the line contact of prior art transmissions of this class. And the approach engagement of teeth and wheel is silent due to the large area of contact and the relatively slow relative radial movement of the tooth and wheel at the time of engagement.

Each band 17, as a portion thereof moves from the straight flight to a wheel, bends only sufficiently to conform to the curvature of the wheel and this degree of curvature may be caused to be well within the elastic limit of the material by choosing band material of suitable composition, heat treatment and thickness. The band 17 joins the tooth 4 tangentially to the relatively large radius curvature of the surface 24 above described and therefore bends the material of the band but very slightly and well within the elastic limit of the material. Thus there is no tendency for the band to crystallize or to develop "fatigue" at any point, either at the teeth or between them.

Furthermore, there is no tendency for the belt to stretch or become permanently longer in use, because wear is absent and stretch of the material is absent, and this important advantage is augmented by the further advantage that the belt may be operated under resilient tension between the wheels to compensate for vibratory loads and to eliminate slack and whipping.

The several units 16 function jointly as a single belt which therefore, due to the crown 13 on the wheels is self-centering thereon and does not tend to run off of the wheels axially.

By joining or securing alternate bands to each tooth and overlapping the tooth by the intermediate band, the aforesaid partitions or reinforcing connecting walls 25 may be provided under the said overlapping band, and thus a tooth may be constructed of lighter weight and greater strength than would be possible if every band were secured to the tooth, because in the latter case, the walls 22—22 would have to be strong enough to be self-supporting. The partitions 25 by virtue of their rounded faces 29 permit the band 17 to bend thereover when on the wheels without bending the band beyond its elastic limit. The bands 17 in their tooth overlapping portions tend to hold the overlapped tooth into the tooth space in which it is lodged, against the action of centrifugal force thereon.

As is well known, spring steel or steel alloys have enormous strength for relatively small cross sectional area and therefore the bands 17 may be extremely light in weight. The construction of the teeth 4 which requires therefor merely a shell also results in light weight teeth. Thus the belt as a whole may be very light in weight and may be operated at very high velocities with relatively small centrifugal force developed therein in those portions engaged with the wheels, which in the case of heavy transmission belts and chains, tends to disengage them from the wheels.

It will be understood that there may be a pin 32 for each one of the bands 17 for securing its free ends and thus the several joints between the ends of the several bands 17 will be distributed around the endless belt so that each band joint will be overlapped by a continuous portion of other bands and thus, if there be any difference in strength between the main portion of the band and its joint, these differences will be equalized and the belt as a whole will be of substantially the same strength, in all of its portions.

Similarly, as will be understood, two or more of the bands may be joined together at a single pin 32. In the overlapping arrangement of Fig. 2, at least two such pins 32 will be required as will be understood.

In this connection it will furthermore be understood that it is not essential to employ the staggered relation of Fig. 2. For example, each of the bands 17 may be secured to all of the teeth, in which case a single pin 32 may be employed or a plurality scattered around the belt may be employed.

Figure 8:
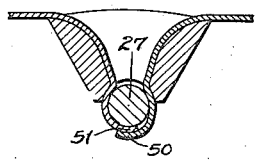
Fig. 8 is a view similar to Fig. 6 showing a modification.

In some instances, I have found that it is not necessary to form the radial portions 31—31 of Fig. 6 on the free ends of the bands nor to clamp them into a groove 33 in the pin, but that it is sufficient simply to bend the free ends of the bands into the circular form 19 and lap one end over the other end as plainly shown in Fig. 8, in which the overlapping ends are indicated at 50 and 51.

As a further modification, each of the units of the belt, 16, may be composed of a number of pieces instead of a single band piece 17. In such form, the several pieces of the bands will be joined to the teeth at the free ends of the pieces in the same or similar manner to that described hereinbefore for the two free ends of the single band 17 and it is believed that further illustration or description is unnecessary.

Referring to Fig. 9, I have shown a modification of my invention in which a single band of resilient material is employed instead of a plurality of bands 17. In this form, one of the teeth such as the tooth 60 is made longer, transversely of the belt, than the other teeth. One end of the resilient metal band 61 is secured to the tooth 60 in the same manner as the band 17 of Fig. 2 is secured to one of the teeth intermediate the ends of the band 17. The free end of the band 61, Fig. 9, is cut off as at 62 at the tooth 60 after being secured thereto.

The band 61 is disposed in a generally helical configuration in successive convolutions of the continuous piece of resilient material. The several convolutions are therefore disposed adjacent to each other as at 63, 64, 65 etc. Any desired number of convolutions may be thus provided and the end of the last convolution 66 is secured to the tooth 69 at the other end of the tooth in the manner above described and the end of the band cut off as at 67 after being secured to the tooth.

The entire band 61 may thus, if desired, be formed with a plurality of spaced portions such as the portions 18 of Fig. 3 and then assembled with a plurality of teeth as in Fig. 9, the tooth 60 being longer as above referred to than the other teeth 63—68. The teeth 68 may be like or similar to the teeth of Figs. 1 to 4. If desired, for the advantages set forth hereinbefore, the teeth 68 and the tooth 60 may be subdivided by the partitions 25 and adjacent convolutions on each tooth may overlap the tooth instead of being secured to it, similarly in this respect to the arrangement of Fig. 2. Or, if desired, the partitions may be omitted and each convolution secured to each tooth.

Above I have described the band 61 as being of indefinite length and as being cut off at the tooth 69 after being secured thereto but as will be obvious, the band 61 may be of predetermined definite length and may be cut off at the points 62 and 67 before assembling it with the teeth.

My invention is not limited to the exact details of construction shown and described. Many changes and modifications other than those shown may be made within the spirit of the invention without sacrificing its advantages.

I claim:

1. In an endless belt type transmission device, a belt composed of a plurality of parallel bands of resilient metal disposed adjacent to each other transversely of the belt, a plurality of teeth disposed on the inside of the belt in spaced relation longitudinally, the teeth comprising each a plurality of outwardly divergent pockets spaced transversely of the belt and disposed respectively under the bands, alternate teeth longitudinally of the belt being secured to alternate bands transversely of the belt by longitudinally spaced loops permanently formed in the bands projected inwardly into the pockets and pins projected through the closed ends of the loops.

2. An endless belt comprising a plurality of longitudinally parallel belt strands and a plurality of longitudinally spaced teeth each extending across all of the strands transversely, and secured to transversely alternate strands, and the transversely intermediate strands engaging radially outer portions of the teeth to restrain the engaged teeth from outward movement from a wheel upon which the belt runs.

3. In a power transmission belt device, a plurality of continuous closed strands of flat spring steel ribbons of substantially equal lengths, a plurality of longitudinally spaced gear-engageable teeth on the inner faces of the ribbons, a plurality of longitudinally spaced inwardly projecting outwardly open loops formed on the ribbons, to which the teeth are attached, each loop having a shoulder portion engaging the tooth at a portion of the tooth adjacent the individual loops to prevent outward withdrawal of the loops, and the ribbons being disposed closely adjacent edge to edge to provide the maximum of ribbon width for the minimum of overall belt width.

4. In a power transmission belt device, a plurality of continuous closed strands of flat spring steel ribbons of substantially equal lengths, a plurality of longitudinally spaced gear-engageable teeth on the inner faces of the ribbons, a plurality of longitudinally spaced inwardly projecting outwardly open loops formed on the ribbons, to which the teeth are attached, each loop formed at the closed end thereof with an enlarged portion engaging a corresponding shoulder portion of the tooth, and the ribbons disposed closely adjacent edge to edge to provide the maximum of ribbon width for the minimum of overall belt width.

5. In a power transmission belt device, a plurality of continuous closed loops of flat spring steel ribbons of substantially equal lengths, a plurality of longitudinally spaced gear-engageable teeth on the inner faces of the ribbons, a plurality of longitudinally spaced inwardly projecting deflected loop portions formed on the ribbons, by which the teeth are attached to alternate ribbons transversely of the belt, and the other alternate ribbons overlapping and engaging underlying portions of the teeth.

6. In a power transmission belt device, a plurality of continuous closed strands of flat spring steel ribbon of substantially equal lengths, a plurality of longitudinally spaced gear-engageable teeth on the inner faces of the strands, a plurality of longitudinally spaced inwardly projecting loop portions formed on the strands, by which the teeth are attached to alternate strands transversely of the belt, and the other alternate strands overlapping underlying portions of the teeth.

7. In a power transmission belt device, a plurality of continuous closed strands of flat spring steel ribbon of substantially equal lengths, a plurality of longitudinally spaced gear-engageable teeth on the inner faces of the strands, a plurality of longitudinally spaced inwardly projecting loops formed on the strands, the teeth having recesses therein and each provided with a shoulder, and the loops projecting into the recesses with the closed end of the loop beyond the shoulder, the projected loop having an enlarged portion at the closed end thereof overlapping the shoulder, and engaging the same to prevent outward withdrawal of the loop from the recess.

8. A power transmission belt device as described in claim 7, and in which a pin element is projected through the enlarged portion of the loop to maintain it in overlapping relation to the shoulder to insure its engagement with the shoulder and thereby prevent outward withdrawal of the loop from the recess.

9. A power transmission belt device as described in claim 7, and in which the walls of the recesses are each provided with two opposed shoulders and the enlarged portion of the loop is in the form of a partly closed eye overlapping and engaging both shoulders and a pin element is projected through the eye to maintain it in engagement with the shoulders to prevent withdrawal of the loop from the recess.

10. In a power transmission belt device, a plurality of continuous closed strands of flat spring steel ribbon of substantially equal lengths, a plurality of longitudinally spaced gear-engageable teeth on the inner faces of the strands, a plurality of longitudinally spaced inwardly projecting loops formed on the strands, the teeth having recesses therein and each provided with a shoulder and the loops projecting into the recesses with the closed end of the loop beyond the shoulder, the loops having enlarged portions at the closed end of the loop overlapping the shoulder and engaging the same, and an element projected through the enlarged portion to maintain it in overlapped relation to the shoulder to prevent withdrawal of the loop from the recess, and the projected element having clearance between it and the tooth on portions thereof adjacent the loop.

11. In a power transmission belt device, a plurality of continuous closed strands of flat spring steel ribbon of substantially equal lengths, a plurality of longitudinally spaced gear-engageable teeth on the inner faces of the strands, a plurality of longitudinally spaced inwardly projecting loops formed on the strands to which the teeth are attached to transmit load from the belt to a belt gear, the teeth having wedge-shaped outer surfaces for engagement with wedge-shaped recesses in the gear, and the teeth having recesses into which the loops are projected and the walls of the recesses being formed to provide the recess with large radius curved side walls to which the loops may conform on portions thereof between the closed end of the loop and the portions of the strand between teeth.

12. In a power transmission belt device, a plurality of continuous closed strands of flat spring steel ribbon of substantially equal lengths, a plurality of longitudinally spaced gear-engageable teeth on the inner faces of the strands, a plurality of longitudinally spaced inwardly projected loops formed on the strands and the teeth having recesses therein into which the loops are projected, and by which the teeth are attached to alternate strands transversely of the belt, the other alternate strands overlapping underlying portions of the teeth, and the loops having at the closed end an enlarged eye portion and a pin element projected through each eye portion and having clearance from portions of the tooth adjacent the loop.

13. In a belt type transmission device, a continuous closed belt strand, having a plurality of longitudinally spaced loops formed thereon, a plurality of longitudinally spaced teeth having each a recess therein and a wall of the recess being provided with a shoulder, the loops being projected into the recesses, and having an enlarged portion at the closed end of the loop overlapping and engaging the shoulder to prevent withdrawal of the loop out of the recess.

14. A belt type transmission device as described in claim 13 and in which a pin form element is projected through the enlarged portion of the loop to hold the enlarged loop portion in overlapping relation to the shoulder.

15. In a belt type transmission device, a continuous closed belt strand having a plurality of longitudinally spaced loops formed thereon, a plurality of longitudinally spaced teeth having each a recess therein and the walls of the recess being provided with a pair of oppositely disposed shoulders, the loops being projected into the recesses and having an enlarged eye form portion at the closed end of the loop overlapping the shoulders to prevent withdrawal of the loop from the recess.

16. A belt type transmission device as described in claim 5, and in which a pin element is projected through the eye of the loop to hold the eye in overlapping relation to the shoulders.

17. In a belt type transmission device, a continuous closed belt strand having a plurality of longitudinally spaced loops formed thereon, a plurality of longitudinally spaced teeth having each a recess therein and a wall of the recess being provided with a shoulder, the loops being projected into the recesses, and having each a partly closed enlarged eye at the closed end portion of the loop adapted to resiliently yieldingly close and ride over the shoulder, and then resiliently return and overlap the shoulder upon projection of the loop into the recess to resist withdrawal of the loop from the recess.

18. A belt type transmission device as described in claim 17, and in which the loop is adapted to receive a pin element through the eye to prevent subsequent closing of the eye and withdrawal of the loop from the recess.

19. A belt type transmission device as described in claim 17, and in which the loop is adapted to receive a pin element through the eye to prevent subsequent closing of the eye and withdrawal of the loop from the recess, and in which the pin element has clearance with all portions of the tooth adjacent the loop to cause load on the strand to be transferred through the loop and eye to the tooth, and not through the pin.

20. A belt tooth element comprising an elongated trough-form body having opposite wedge-form inclined outer faces extending longitudinally thereof, and a plurality of transverse partitions therein forming a series of recesses longitudinally of the tooth, and the outer edges of the partitions being outwardly convex.

21. A belt tooth element comprising an elongated trough-form body having opposite wedge-form inclined outer faces extending longitudinally thereof, and a series of transverse partitions therein forming a series of recesses longitudinally of the tooth, the recesses having opposite wall surfaces generally parallel to the inclined outer faces of the tooth, but being oppositely convex.

22. A belt tooth element comprising an elongated trough-form body having opposite wedge-form inclined outer faces extending longitudinally thereof, a plurality of transverse partitions therein forming a longitudinal series of recesses, and opposite wall surfaces of the recesses being generally parallel to the inclined outer faces and converging over a portion thereof, and then diverging to form a pair of opposite shoulders in the recess.

23. A belt tooth element as described in claim 22, and in which the shoulders of the several recesses have surfaces disposed on an ideal cylinder longitudinally of the tooth.

24. In a power transmission belt device, a closed belt composed of a plurality of parallel strands of flat spring metal ribbon, a plurality of longitudinally spaced gear-engageable teeth on the inner faces of the strands, a plurality of longitudinally spaced inwardly projecting loop portions formed on the strands, by which the teeth are attached to alternate strands transversely of the belt, and the other alternate strands overlapping underlying portions of the teeth.

25. In a power transmission belt device, a closed belt comprising a plurality of parallel strands of flat spring metal ribbon, a plurality of longitudinally spaced gear-engageable teeth on the inner faces of the strands, a plurality of longitudinally spaced inwardly projecting loops formed on the strands, the teeth having recesses therein and each provided with a shoulder, and the loops projecting into the recesses with the closed end of the loop beyond the shoulder, the projected loop having an enlarged portion at the closed end thereof overlapping the shoulder, and engaging the same to prevent outward withdrawal of the loop from the recess.

26. A power transmission belt device as described in claim 25, and in which a pin element is projected through the enlarged portion of the loop to maintain it in overlapping relation to the shoulder to insure its engagement with the shoulder and thereby prevent outward withdrawal of the loop from the recess.

27. A power transmission belt device as described in claim 25, and in which the walls of the recesses are each provided with two opposed shoulders and the enlarged portion of the loop is in the form of a partly closed eye overlapping and engaging both shoulders and a pin element is projected through the eye to maintain it in engagement with the shoulders to prevent withdrawal of the loop from the recess.

28. In a power transmission belt device, a closed belt comprising a plurality of parallel strands of flat spring metal ribbon, a plurality of longitudinally spaced gear-engageable teeth on the inner faces of the strands, a plurality of longitudinally spaced inwardly projecting loops formed on the strands, the teeth having recesses therein and each provided with a shoulder and the loops projecting into the recesses with the closed end of the loop beyond the shoulder, the loops having enlarged portions at the closed end of the loop overlapping the shoulder and engaging the same, and an element projected through the enlarged portion to maintain it in overlapped relation to the shoulder to prevent withdrawal of the loop from the recess, and the projected element having clearance between it and the tooth on portions thereof adjacent the loop.

29. In a power transmission belt device, a closed belt comprising a plurality of parallel strands of flat spring metal ribbon, a plurality of longitudinally spaced gear-engageable teeth on the inner faces of the strands, a plurality of longitudinally spaced inwardly projecting loops formed on the strands to which the teeth are attached to transmit load from the belt to a belt gear, the teeth having wedge-shaped outer surfaces for engagement with wedge-shaped recesses in the gear, and the teeth having recesses into which the loops are projected and the walls of the recesses being formed to provide the recess with large radius curved side walls to which the loops may conform on portions thereof between the closed end of the loop and the portions of the strand between teeth.

30. In a power transmission belt device, a closed belt comprising a plurality of parallel strands of flat spring metal ribbon, a plurality of longitudinally spaced gear-engageable teeth on the inner faces of the strands, a plurality of longitudinally spaced inwardly projected loops formed on the strands and the teeth having recesses therein into which the loops are projected, and by which the teeth are attached to alternate strands transversely of the belt, the other alternate strands overlapping underlying portions of the teeth, and the loops having at the closed end an enlarged eye portion and a pin element projected through each eye portion and having clearance from portions of the tooth adjacent the loop.

31. In a power transmission belt device, a closed belt comprising a plurality of parallel strands of flat spring metal ribbon, a plurality of longitudinally spaced gear-engageable teeth on the inner faces of the ribbons, a plurality of longitudinally spaced inwardly projecting outwardly open loops formed on the ribbons, to which the teeth are attached, each loop having a shoulder portion engaging the tooth adjacent the individual loops, to prevent outward withdrawal of the loops, and the ribbons being disposed closely adjacent edge to edge to provide the maximum of ribbon width for the minimum of overall belt width.

32. In a power transmission belt device, a closed belt comprising a plurality of parallel strands of flat spring metal ribbon, a plurality of longitudinally spaced gear-engagable teeth on the inner faces of the ribbons, a plurality of longitudinally spaced inwardly projecting outwardly open loops formed on the ribbons, to which the teeth are attached, each loop formed at the closed end thereof with an enlarged portion engaging a corresponding shoulder portion of the tooth, and the ribbons disposed closely adjacent edge to edge to provide the maximum of ribbon width for the minimum of overall belt width.

OTTO W. GREENE.